May 30, 1939.  C. S. PHILLIPS  2,160,226
PORTABLE WHEEL ALIGNER
Filed July 21, 1937  4 Sheets-Sheet 1

INVENTOR.
Charles S. Phillips.
BY Philip A. Minnis.
ATTORNEY.

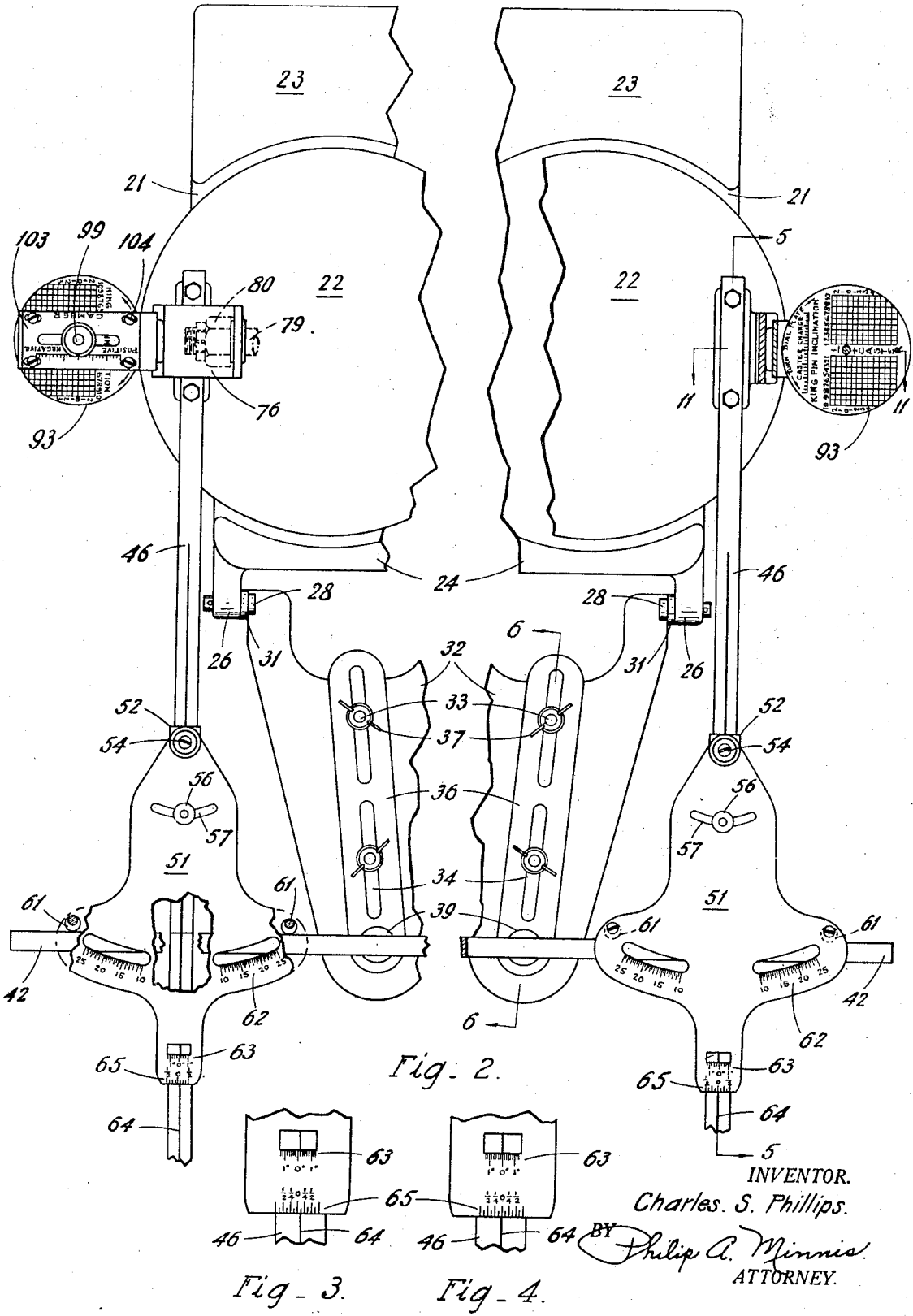

May 30, 1939.　　C. S. PHILLIPS　　2,160,226
PORTABLE WHEEL ALIGNER
Filed July 21, 1937　　4 Sheets-Sheet 3
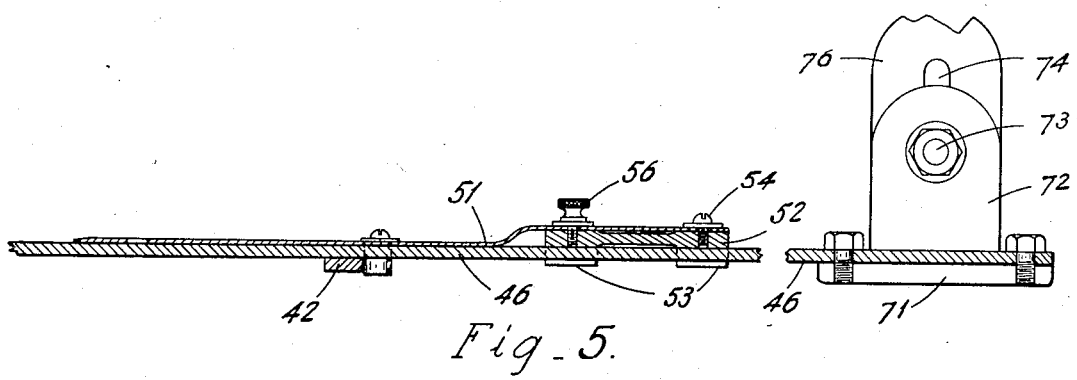
Fig. 5.
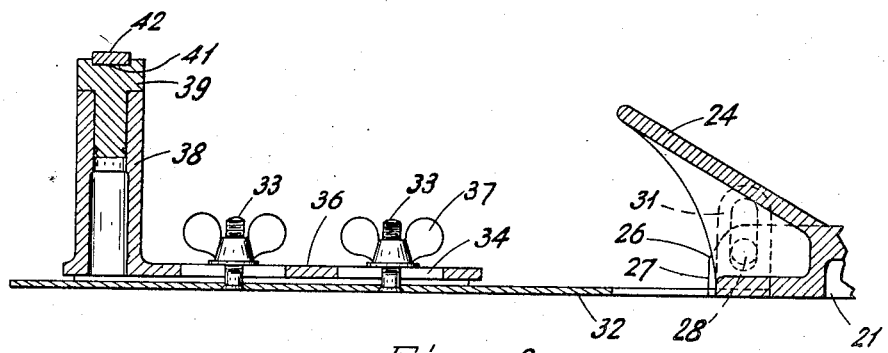
Fig. 6.
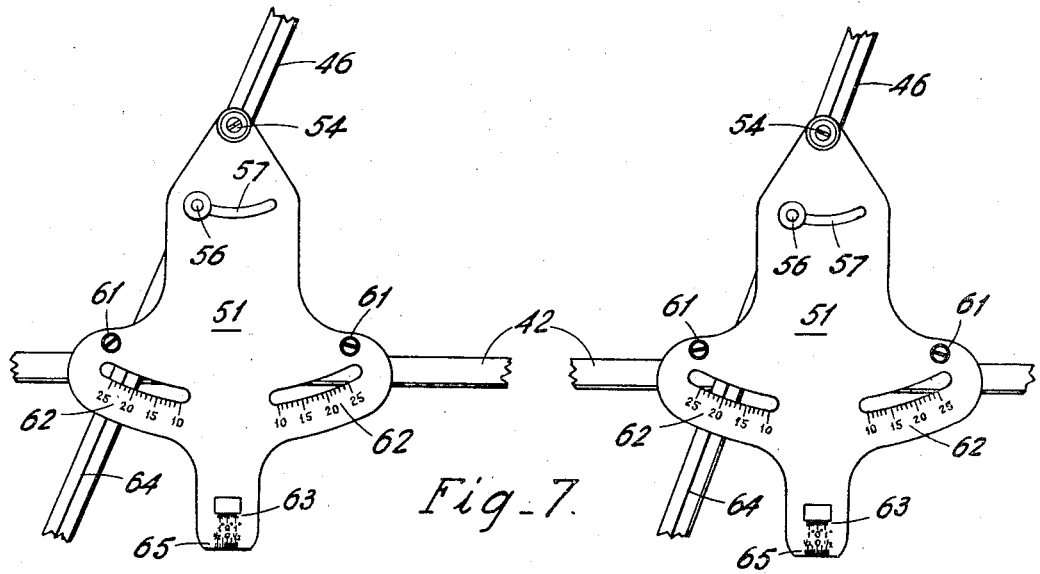
Fig. 7.
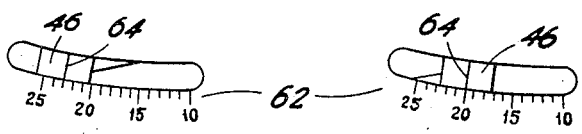
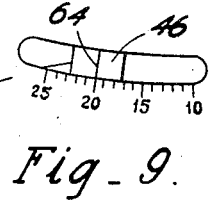
Fig. 8.　　Fig. 9.
INVENTOR.
Charles. S. Phillips.
BY Philip A. Minnis.
ATTORNEY.

May 30, 1939.  C. S. PHILLIPS  2,160,226
PORTABLE WHEEL ALIGNER
Filed July 21, 1937  4 Sheets-Sheet 4
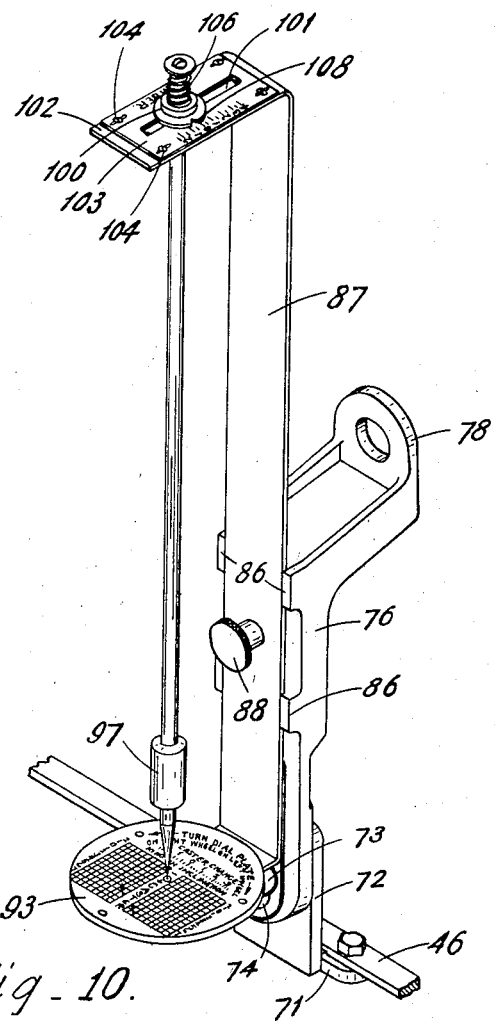
Fig_10.
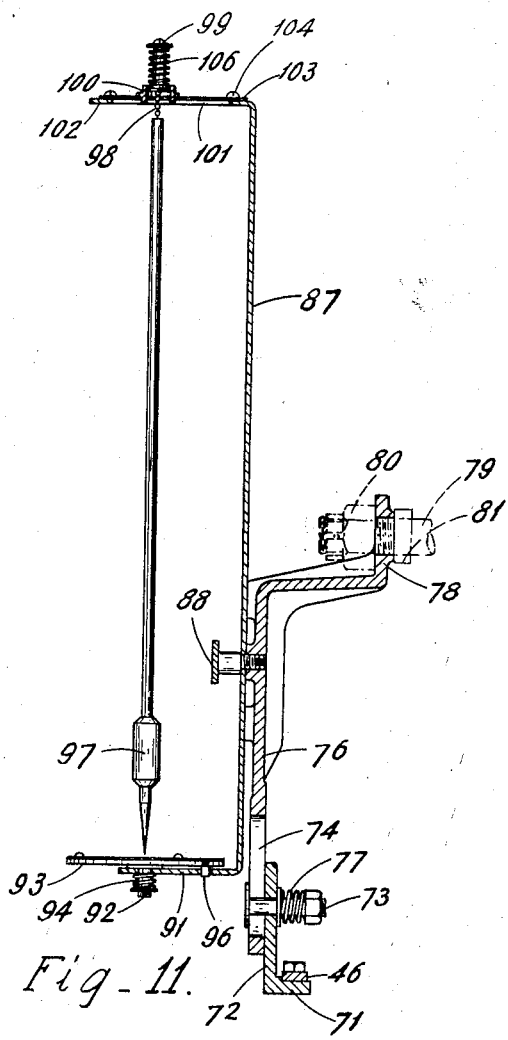
Fig_11.
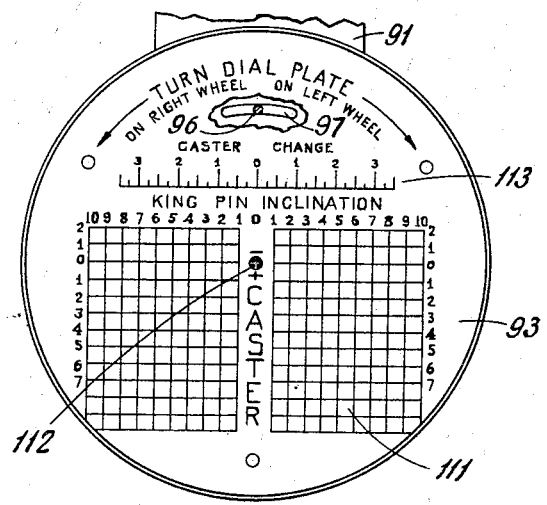
Fig_12.
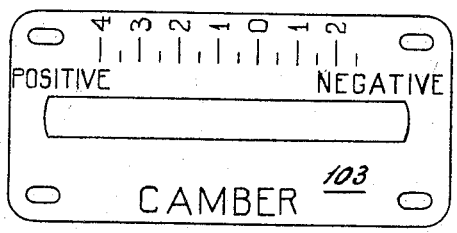
Fig_13.
INVENTOR.
Charles. S. Phillips.
BY Philip A. Minnis,
ATTORNEY.

Patented May 30, 1939

2,160,226

UNITED STATES PATENT OFFICE 2,160,226

PORTABLE WHEEL ALIGNER

Charles S. Phillips, Lansing, Mich., assignor to Food Machinery Corporation, San Jose, Calif., a corporation of Delaware Application July 21, 1937, Serial No. 154,795

20 Claims. (Cl. 33—203)

This invention relates to wheel aligning apparatus for the dirigible wheels of automotive vehicles, and more particularly to an improved apparatus of this character of a simple and portable nature.

It is a general object of the invention to provide an improved wheel aligner of a construction which lends itself to portability and which can be set up and dismantled easily.

Another object of the invention is to provide an aligner of the character referred to, which by simple and convenient operation enables checking of all alignment characteristics of the dirigible wheels of automobiles.

Another object of the invention is to provide a wheel aligner which can be used easily with different tread vehicles such as busses, trucks and the like.

Another object of the invention is to provide an aligner of the character referred to, which can be manufactured economically.

Other objects will appear from the following description of a preferred embodiment, as illustrated in the accompanying drawings, in which Fig. 1 is a schematic perspective view of the wheel aligner with an automobile in position.

Fig. 2 is an enlarged plan view of the aligner with certain parts broken away to show the construction more clearly.

Figs. 3 and 4 are enlarged fragmentary views of the turning scales shown in Fig. 2, as adjusted to read toe-in.

Fig. 5 is a vertical longitudinal section through one of the side bar and scale assemblies of the aligner and is taken in a plane indicated by the line 5—5 in Fig. 2.

Fig. 6 is a vertical longitudinal section illustrating the supporting structure for the parallel linkage of the aligner and is taken in a plane indicated by the line 6—6 in Fig. 2.

Fig. 7 is a fragmentary plan view showing the turning scales and indicator bars in one adjusted position thereof during the checking for toe-out of the vehicle wheels.

Figs. 8 and 9 are enlarged fragmentary views showing the turning scales and the indicator bars positioned as in Fig. 7.

Fig. 10 is an enlarged perspective view of one of the spindle standards including the scale and indicator means used in checking camber, caster and king pin inclination.

Fig. 11 is a vertical transverse section of the structure shown in Fig. 10, and is taken in the plane of the line 11—11 in Fig. 2.

Fig. 12 is an enlarged view of the caster and king pin inclination scale plate.

Fig. 13 is an enlarged view of the camber scale plate.

Figure 1:
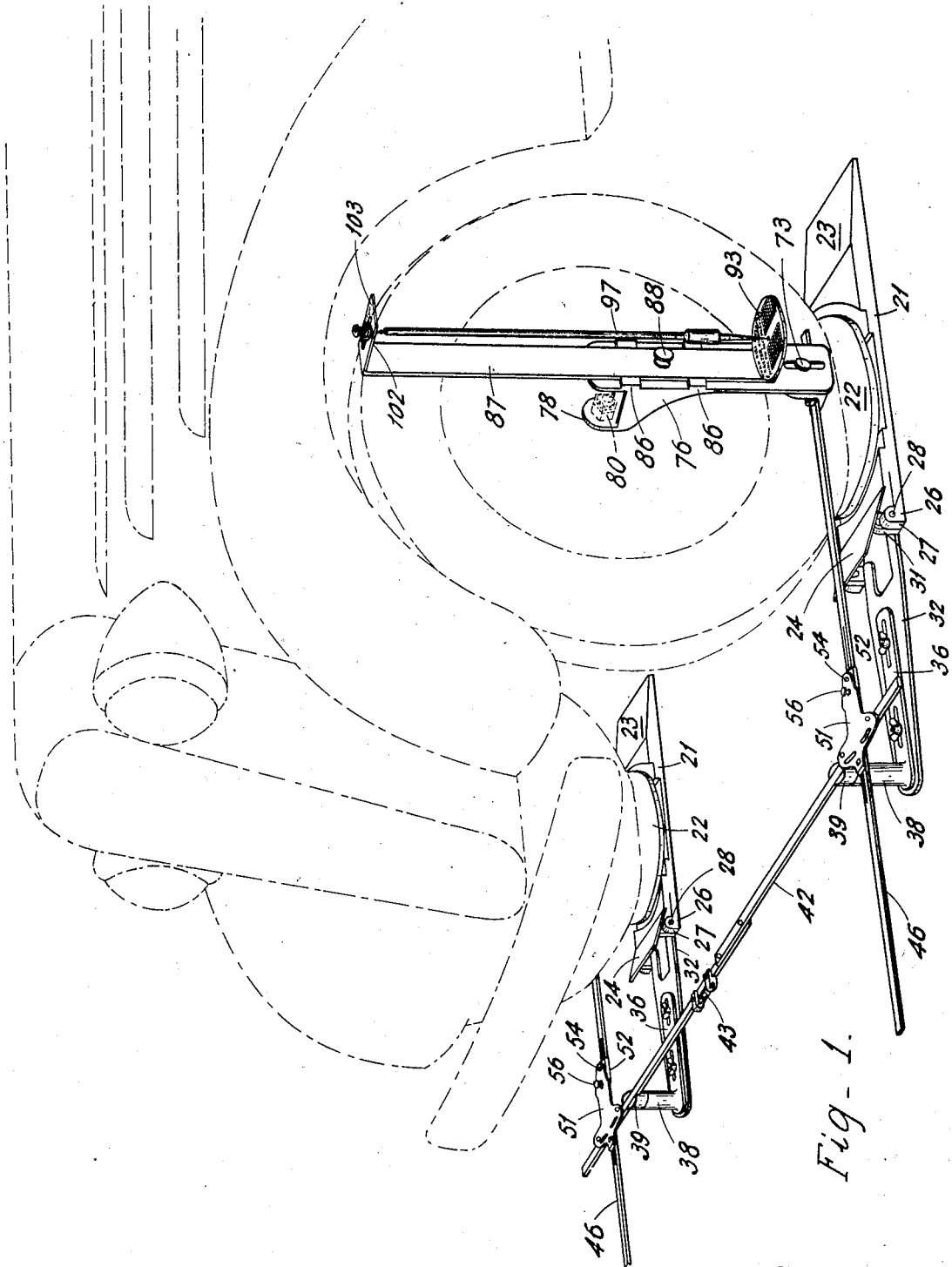

Generally, the aligner of my invention includes a pair of portable wheel supports including turntables which are set up in parallel relation to receive the dirigible wheels of the vehicle and to position certain other parts of the apparatus, including a linkage, whose motion is contolled by turning of the wheels, and a pair of aligning standards which are mounted on the wheel spindles.

Generally, the linkage includes a pair of side indicator bars which are supported on a transverse leveling bar at their front ends and at their rear ends from the respective spindle standards. The spindle standards include the means for checking the caster, camber and king pin inclination, while at the intersection of the bars, scale means are provided for measuring toe-in and toe-out as well as the angular amount of turning of a wheel from straight ahead position.

Referring to Figs. 1 and 2, each of the wheel supports may comprise a base plate 21 on which a turntable 22 may be journalled in any suitable manner forwardly of an inclined runway 23 and rearwardly of an inclined wheel stop 24. Preferably, leveling blocks (not shown) are provided for the rear wheels of the vehicle so that the vehicle when having its front wheels supported on the turntables will be level. Each base plate 21 is provided with parallel forward extensions terminating in bosses 26 having their front faces 27 machined to lie in the same vertical plane whereby to facilitate accurate alignment of the two base plates as will be described later.

The bosses 26 of each base plate receive respective pivot pins 28 (Figs. 1, 2 and 6) which extend through vertical slots in ears 31 of a plate 32, one of which extends forwardly from each base plate to support the front leveling and guiding bar. Each plate 32 (Fig. 6) carries a pair of upstanding threaded studs 33 which extend through longitudinal slots 34 in a support bracket 356 for the front bar to receive respective wing nuts 37 Adjacent their front ends each supporting bracket 36 is provided with an upstanding boss 38 which receives a post 39 for rotative adjustment. The upper end of the post 39 is provided with a transverse slot 41 (Fig. 6) in which the front leveling and guiding bar 42 is slidably received. The leveling bar 42 may be made in two sections as shown in Fig. 1, on one of which a level 43 of conventional construction may be suitably secured.

As stated above, the leveling bar 42 projects beyond the posts 39 and slidably supports similar indicator bars 46 which turn with the respective wheels and form part of the linkage arrangement for measuring the angular turning of the wheels. Such measuring is effected by means of a pair of scale plates 51 mounted at the respective intersections of front bar 42 with indicator bars 46. Each scale plate 51 is mounted for sliding movement longitudinally of the associated bar 46, and has its angular position controlled by the front bar 42. For this purpose, each plate 51 (Figs. 1, 5 and 7) is mounted on a supporting slide 52 having flanges 53 engaging the sides of the associated bar 46, and connected to the associated plate 51 by means of a pivot screw 54 and a stop screw 56 engaging arcuate slot 57 formed in plate 51 concentric with its pivotal axis at screw 54. As seen in Figs. 2 and 7, each scale plate 51 is provided with a pair of eccentric contact pins 61 for engagement with the bar 42 so as to maintain the angular position of the scale plate irrespective of angular movement of the associated bar 46. By preadjustment contact pins 61 are so located that when the associated wheel is in straight ahead position, that is, the associated indicating bar 46 and front bar 42 are at right angles to each other and the bar 42 has an edge aligned with similar transverse scribed line 66 on the bar 46, the scale plate 51 will be in zero position.

As seen most clearly in Fig. 2, each plate 51 is provided with a pair of similar opposite scales 62 reading from 10° to 25° in opposite directions and a pair of small scales 63 and 65 adjacent its outer end and reading from 0 to 1° and 0 to ¾″, respectively, to either side of the zero marks. All of these scales cooperate with a longitudinal scribed line 64 in the bar 46 forming an index for reading the angular position of the bar from straight ahead position. As will be described later, scales 62 are used to indicate the angular position of a wheel from straight ahead position in determining caster and king pin inclination, as well as for indicating toe-out or steering geometry, while scales 63 and 65 read the amount of toe-in in degrees and inches, respectively. The scale plate 51 is suitably apertured adjacent each of scales 62 and 63 to enable comparison of the index 64 therewith.

Each of the bars 46 extends rearwardly from the front bar 42 and is supported for turning movement with the associated spindle standard. As seen in Fig. 5, the rear end of each bar 46 is secured by suitable fastening screws to a horizontal flange 71 of a bracket 72 which is mounted for vertical movement by pin 73 in vertical slots 74 of a spindle bracket 76. The vertically adjusted position of the bracket 72 and therefore of the rear ends of bars 46, is maintained by compression spring 77 interposed between a nut on pin 73 and the bracket 72. Spindle bracket 76 is provided at its upper end with offset upright flange 78 which is apertured to fit over the reduced end of the spindle 79 and to be secured thereagainst by the spindle nut 80. Usually a washer or collar 81 is interposed between flange 78 and the outer core of the bearing to prevent interference of the wheel hub with the flange 78.

The spindle bracket 76 also provides a mounting for other parts of the spindle standard including the indicating means for caster, camber, and king pin inclination, and for this purpose is provided with spaced apart sets of vertically disposed ears or guides 86 to receive a vertical scale or gauge bracket 87, which is clamped therein as by a screw 88 threaded in a suitable boss of the bracket 76. The scale bracket 87 (Fig. 11) is generally U-shaped and its bottom flange 91 is apertured to receive pivot pin 92 of the caster and king pin inclination scale plate 93 which is resiliently held in any rotatably adjusted position by a spring 94 interposed between bracket flange 91 and a suitable washer on the pivot pin 92. To limit the turning movement of the scale plate 93, such plate is provided with a downwardly projecting pin 96 (Figs. 11 and 12) engaging an arcuate slot 97 in bracket flange 91.

Indicating means is provided for the caster and king pin inclination scales in the form of a pendulum or plumb bob 97 which is supported by a chain 98 from a pin 99 mounted in collar 100, which is slidably and non-rotatably engaged in a transverse slot 101 of top bracket flange 102 and in slotted camber scale plate 103 (Figs. 1 and 11) adjustably mounted by the screws 104 on flange 102. To resist movement of the collar 99 in the slot 101, compression spring 106 is interposed between a suitable washer on pin 99 and the top flange of collar 100, the chain 98 being connected to the lower end of the pin 99.

As seen in Figs. 10 and 13, scale plate 103 is provided with graduations to read camber when compared with an index 108 in the form of a V-shaped notch in a flange of the collar 100.

As previously stated, the pendulum indicator 97 cooperates with the scale plate 93, which is provided with a combined king pin inclination and caster scale 111 which, as seen in Fig. 12 is made in two sections to either side of a central zero mark 112 to enable its use with either wheel. Caster is read by movement of the pointer laterally with respect to the vehicle, i. e. up and down as viewed in Fig. 12, and king pin inclination is read by movement of the indicator longitudinally of the vehicle, i. e. from side to side as viewed in Fig. 12. Scale plate 93 is also provided with a caster change scale 113 for cooperation with indicator 97 with the plate 93 positioned as shown in Fig. 12.

Having described the various component parts of my improved wheel aligner, I will now explain its advantages and the function of the various parts in connection with the description of how the aligner is set up and how the various alignment characteristics of front vehicle wheels are checked thereon.

To set up the apparatus, the vehicle is placed on a floor which is preferably level and the turntable assemblies are placed immediately in position with respect to the front wheels, so that when the vehicle is moved forward, the wheels will be on the center of the turntables. Suitable rear wheel leveling blocks are also placed in front of the rear wheels so that the vehicle will be level when in position. Using the front bar 42 with its level 43, the relation of the two turntables is tested, and, if necessary, shims are used to get the turntables exactly level. The front bar 42 is then used as a straight edge, being placed in engagement with the machined surfaces 27 at the front of the support plates 21, and the plates adjusted until they are parallel, after which the bar 42 is placed in its slots in the posts 39. The following operations are then performed on each side of the car.

The hub cap, spindle nut, and key washer are removed from each front wheel, and the respective spindle brackets 76 are placed over the spindles. If there is insufficient clearance so that a spindle bracket touches the hub, a suitable spacer washer is interposed and thereafter the spindle nut is placed on the spindle to secure the bracket in place. In some instances, a centering bushing may be required with the spindle bracket for small spindles.

Thereafter, the parallel side bars 46 are secured to the spindle brackets and placed over the front bar 42, and the respective gauge brackets 87 are secured in place on the spindle brackets 76.

Then, with the wheels in straight ahead position, the spindle brackets are rotated on the spindles until the pendulum indicators are in transverse alignment with the zero mark 112 on plate 93 and the pendulum is shifted in and out with respect to the camber scale until its point registers exactly with the mark 112. It may be noted at this point that this adjustment of the pendulum, so moves the index 108 with respect to the camber scale that the camber may be read. However, the reading is usually not taken until all of the alignment characteristics are checked.

The front cross bar 42 is then adjusted by means of its supporting brackets 36 so that it registers exactly with the index 66 (see Fig. 2) on each indicator bar 46, and then the scale plates 51 are put in position on the bars 46 with their stops 61 both engaging the bar 42. This completes the assembly of the wheel aligner and it is ready for the checking operation which will now be described.

The wheel to be checked is turned out for a given angle, which is 25° for the scales as shown, by aligning the index 64 of the associated indicator bar 46 with the 25° indication on the associated scale 62. The scale plate 93 is then turned in the direction of the appropriate arrow in Fig. 12 depending on which wheel is being tested.

With these adjustments made, the amount of caster and king pin inclination can be read in the appropriate directions on one of the scales 111, while the camber has already been adjusted on the scale 103.

The scale plate 93 also is provided with a caster change scale 113 so that by setting the pendulum indicator 97 to register with this scale and rotating the spindle bracket 76 on the spindle so that the indicator reads 0 on the scale 113, the caster correction can then be made and the change in caster will be indicated on the scale 113.

To check toe-in, one wheel, for example the left wheel, is set in straight ahead position so that the associated line or index 64 will register with zero on the scales 63 and 65 as illustrated in Figs. 2 and 4. As the left wheel is set in straight ahead position, the scales 63 and 65 in Fig. 4 and to the right of Fig. 2 indicate this setting. With this adjustment, the toe-in will be indicated by the index 64 on the scales 63 and 65 in Fig. 3 and to the left in Fig. 2.

To check toe-out, i. e., steering geometry, one wheel of the vehicle is turned in for a selected angle, which, for the scale used is 20°, this condition being illustrated with right hand scale plate 51 in Figs. 7 and 9. Then the toe-out will be indicated on the left hand scale plate 51 by the index 64.

From the above description, it is seen that the wheel aligner of my invention is of simple construction and provides for economical manufacture, as well as enabling easy checking of all the wheel alignment characteristics of dirigible wheels.

While I have shown and described a preferred embodiment, the invention is capable of change and variation from the form shown, so that its scope is to be limited only by proper interpretation of the appended claims.

I claim:

1. A wheel aligner comprising a pair of supports for the dirigible wheels of a vehicle, a cross bar connected to and held by said supports to provide a fixed reference, a pair of aligner heads adapted for mounting to move with said wheels, and indicating bars carried by said heads and supported on said cross bar for relative turning movement with respect thereto whereby to afford an indication of the angular position of the wheels.

2. A portable wheel aligner comprising a pair of supports for the dirigible wheels of a vehicle, said supports having gauge faces to facilitate adjustment thereof into parallel relation, a cross bar positioned by said supports in parallel relation to the axle for said wheels, a pair of aligning heads adapted for mounting to move with said wheels, and indicating bars carried by said heads and movably supported on said cross bar to provide an indication of the angular position of the wheels.

3. A wheel aligner comprising a pair of supports for the dirigible wheels of a vehicle, a cross bar positioned by said supports, a pair of aligning heads adapted for mounting to move with said wheels, and indicating bars carried by said heads and supported on said cross bar, the connection of said indicating bars to said heads providing for relative vertical adjustment therebetween.

4. A wheel aligner comprising a pair of supports for the dirigible wheels of a vehicle, a cross bar connected to and held by said supports in parallel relation to the axle for said wheels to provide a fixed reference, a pair of aligning heads adapted for mounting to move with said wheels, indicating bars carried by said heads and supported on said cross bar, and index means between said cross bars and each indicating bar for determining the position of said indicating bars relative to said cross bar in the straight ahead position of said wheels.

5. A wheel aligner comprising a pair of supports for the dirigible wheels of a vehicle, a cross bar connected to and held by said supports to provide a fixed reference, a pair of aligning heads adapted for mounting to move with said wheels, indicating bars carried by said heads and supported on said cross bar, and scale means associated with each indicating bar and said cross bar for measuring steering movement of the associated wheel.

6. A wheel aligner comprising a pair of wheel supports, each support including a base and a turntable thereon, a plate connected to and extending forwardly from each support, a post carried by each plate, a cross bar carried by said posts, a pair of aligning heads for mounting on the spindles of the vehicle wheels and including means for indicating the deviation of the wheels from vertical position, a horizontal indicating bar extending forwardly from each head and intersecting said cross bar, and a scale associated with each indicating bar and said cross bar for reading the angular turning of an associated wheel.

7. A wheel aligner comprising a pair of wheel supports, each support including a base and a turntable thereon, a plate connected to and extending forwardly from each support, a post carried by each plate, a cross bar carried by said posts in parallel relation to the axle of a vehicle, a pair of aligning heads for mounting on the spindles of the vehicle wheels and including means for indicating the deviation of the wheels from vertical position, a horizontal indicating bar extending forwardly from each head and intersecting said cross bar, each said indicating bar having a longitudinal index thereon, and an apertured plate associated with each indicating bar and said cross bar for reading with the associated index the angular turning of an associated wheel.

8. A wheel aligner comprising a pair of wheel supports, each support including a base and a turntable thereon, a plate connected to and extending forwardly from each support, a post carried by each plate, a cross bar carried by said posts, a pair of aligning heads for mounting on the spindles of the vehicle wheels and including means for indicating the deviation of the wheels from vertical position, a horizontal indicating bar extending forwardly from each head and intersecting said cross bar, and a scale mounted on each indicating bar for longitudinal sliding movement thereon and for pivotal movement relative thereto, each said scale having means engaging said cross bar to control the angular position of said scale.

9. A wheel aligner comprising a pair of wheel supports, each support including a base and a turntable thereon, a plate connected to and extending forwardly from each support, a post carried by each plate, a cross bar carried by said posts, a pair of aligning heads for mounting on the spindles of the vehicle wheels and including means for indicating the deviation of the wheels from vertical position, a horizontal indicating bar extending forwardly from each head and intersecting said cross bar, and indicating means associated with each indicating bar for longitudinal sliding movement relative thereto and for pivotal movement relative thereto, each said indicating means having means engaging said cross bar to control the angular position of said indicating means.

10. Wheel aligning apparatus comprising a pair of wheel supports, a pair of aligning heads for attachment to the respective wheel spindles of a vehicle for movement therewith, each head including an indicating bar extending forwardly therefrom, a front cross bar mounted in fixed position for supporting said indicating bars, and scale means mounted at the intersection of said front bar with each of said indicating bars for measuring turning of the wheels during steering movement thereof by measuring relative turning movement between said bars.

11. Wheel aligning apparatus comprising a pair of wheel supports, a pair of forwardly extending horizontal indicating bars for attachment to the respective wheel spindles of a vehicle for movement therewith, a front cross bar mounted in fixed position for supporting said indicating bars, and scale means mounted at the intersection of said front bar with each of said indicating bars for measuring turning of the wheels during steering movement thereof by measuring relative turning movement between said bars.

12. Wheel aligning apparatus comprising a pair of wheel supports, a pair of forwardly extending horizontal indicating bars for attachment to the respective wheel spindles of a vehicle for movement therewith, a front cross bar for supporting said indicating bars to provide for relative transverse adjustment therebetween in accordance with the tread of the vehicle, and scale means mounted at the intersection of said front bar with each of said indicating bars for measuring turning of the wheels during steering movement thereof, said scale means being freely movable along said front bar.

13. Wheel aligning apparatus comprising a horizontal indicating bar for mounting on the spindle of the dirigible wheel of a vehicle to move as a unit with said spindle, a reference bar mounted in fixed relation to the axle of the vehicle and intersecting said indicating bar, and a scale associated with said bars to measure relative turning movement therebetween, said scale being mounted for longitudinal sliding movement and for relative pivotal movement on one of said bars and having its anguar position controlled by the other of said bars.

14. Wheel aligning apparatus comprising a horizontal indicating bar for mounting on the spindle of the dirigible wheel of a vehicle to move as a unit with said spindle, a reference bar mounted in fixed relation to the axle of the vehicle and intersecting said indicating bar, and a scale associated with said bars to measure relative turning movement therebetween, said scale being mounted for longitudinal sliding movement and for relative pivotal movement on one of said bars and having adjustable contact means engaging the other of said bars to maintain its angular relation thereto.

15. Wheel aligning apparatus including means for indicating the straight ahead position of the front wheels of a vehicle, a standard for attachment to a wheel in a plane parallel to the plane of the wheel, a pendulum, means mounting said pendulum on said standard for adjustment laterally of said wheel, a camber scale associated with said mounting means, and an index for cooperation with the lower end of said pendulum to register therewith with said standard in vertical position and with said camber scale reading zero, whereby the movement of said mounting means necessary to cause said pendulum to register with said index with said standard on a wheel provides an indication on said chamber scale of the camber of the wheel.

16. Wheel aligning apparatus including a standard for attachment to the spindle of the front wheel of a vehicle, a camber scale adjacent the upper end of said standard, a pendulum, a pendulum support movable on said standard laterally of the wheel, an index on said support associated with said camber scale, and a fixed index on said standard associated with the lower end of said pendulum.

17. A portable wheel aligner comprising a pair of portable supports for the dirigible wheels of a vehicle, said supports having gauge means providing for adjustment of said supports into a predetermined angular relation with respect to each other, a cross bar positioned by said supports in parallel relation to the axle for said wheels, a pair of aligning heads adapted for mounting to move with said wheels during steering movement thereof, and an indicating bar carried by each of said heads and movably supported on said cross bar to provide an indication of the angular position of the wheel with which the associated aligning head is mounted for movement.

18. A portable wheel aligner comprising a pair of supports for the dirigible wheels of a vehicle, said supports having gauge means providing for adjustment of said supports into a predetermined angular relation with respect to each other, a cross bar positioned by said supports in parallel relation to the axle for said wheels, a pair of aligning heads adapted for mounting to move with said wheels during steering movement thereof, an indicating bar carried by each of said heads and movably supported on said cross bar to provide an indication of the angular position of the wheel with which the associated aligning head is mounted for movement, and scale means at the intersection of each indicating bar and said cross bar for measuring the indication provided by relative turning movement therebetween.

19. A wheel aligner comprising a pair of supports for the dirigible wheels of a vehicle, a cross bar connected to and held by said supports, a pair of aligning heads adapted for mounting to move with said wheels during steering movement thereof, indicating bars carried by said heads for relative vertical adjustment and supported on said cross bar, and scale means at the intersection of each indicating bar and said cross bar for measuring the relative turning movement therebetween.

20. Wheel aligning apparatus comprising a pair of forwardly extending horizontal indicating bars for attachment to the respective dirigible wheel spindles of a vehicle for movement therewith, a reference bar mounted in fixed relation to the axle of the vehicle and intersecting said indicating bars to provide for relative transverse adjustment therebetween in accordance with the tread of the vehicle, and scale means mounted at the intersection of said front bar with each of said indicating bars for measuring relative turning movement therebetween.

CHARLES S. PHILLIPS.